United States Patent
Bolander et al.

(10) Patent No.: US 7,812,725 B2
(45) Date of Patent: Oct. 12, 2010

(54) SYSTEM FOR POWERING AND READING RFID TAGS

(75) Inventors: Jarie G. Bolander, San Francisco, CA (US); Paul A. Lovoi, Saratoga, CA (US); Geoff A. Zawolkow, San Carlos, CA (US)

(73) Assignee: Tagent 6 Corporation, Mountain View, CA (US)

( * ) Notice: Subject to any disclaimer, the term of this patent is extended or adjusted under 35 U.S.C. 154(b) by 187 days.

(21) Appl. No.: 11/644,075

(22) Filed: Dec. 21, 2006

(65) Prior Publication Data

US 2008/0150696 A1 Jun. 26, 2008

(51) Int. Cl.
*G08B 13/14* (2006.01)

(52) U.S. Cl. .............. 340/572.1; 340/10.1; 340/539.21; 340/825.69

(58) Field of Classification Search ... 340/572.1–572.9, 340/825, 10.1, 568.1, 5.1, 5.8, 825.36, 825.49, 340/10.3, 10.34, 539.21, 825.69
See application file for complete search history.

(56) References Cited

U.S. PATENT DOCUMENTS

| | | | |
|---|---|---|---|
| 6,480,699 B1 * | 11/2002 | Lovoi | 455/41.2 |
| 6,804,578 B1 * | 10/2004 | Ghaffari | 700/229 |
| 7,030,761 B2 * | 4/2006 | Bridgelall et al. | 340/572.2 |
| 7,400,248 B2 * | 7/2008 | Yarvis | 340/572.1 |
| 2004/0099736 A1 * | 5/2004 | Neumark | 235/385 |
| 2004/0160233 A1 | 8/2004 | Forster | |
| 2006/0107307 A1 | 5/2006 | Knox et al. | |
| 2006/0261821 A1 | 11/2006 | Lee et al. | |
| 2006/0273900 A1 | 12/2006 | Posamentier | |
| 2007/0109121 A1 * | 5/2007 | Cohen | 340/539.26 |
| 2008/0018434 A1 * | 1/2008 | Carrender et al. | 340/10.31 |
| 2008/0157972 A1 * | 7/2008 | Duron et al. | 340/572.1 |

FOREIGN PATENT DOCUMENTS

JP 2006217393 8/2006

* cited by examiner

*Primary Examiner*—Daniel Previl
(74) *Attorney, Agent, or Firm*—Thomas M. Freiburger

(57) ABSTRACT

A system for tracking items using passive RFID tags utilizes separate data and power frequencies. Within an area in which the items are located, one or more data readers are provided but many more separate power modules are distributed through the space, for powering up the tags. With the power nodes distributed, the tags are powered from a relatively short distance, enabling the tags to transmit through a greater distance. One or more of the readers can include a power-node control which sends an RF signal to control on/off status of specific power nodes within the area, so that power nodes can be activated zone by zone, to thereby permit the reader to determine location by zone of products as their RFID tags are read.

15 Claims, 3 Drawing Sheets

SYSTEM FOR POWERING AND READING RFID TAGS

BACKGROUND OF THE INVENTION

This invention concerns radio frequency ID tags, preferably passive RFID tags in miniature size, and a system for efficiently powering and reading the tags to track or inventory products carrying the tags.

The concept of tracking, counting or inventorying items of commerce using radio frequency ID (RFID) tags is well known. See, for example, U.S. Pat. No. 6,480,699, describing miniaturized passive RFID tags with onboard antennas. These tags can be as small as about 0.5 mm×0.5 mm with an even smaller thickness dimension, and they are powered solely by a powering RF signal sent by a reader or power module, thus storing sufficient power for a sufficient period of time to transmit data carried by the particular RFID tag.

RFID interrogators or readers, which transmit a relatively high-powered signal in order to power up the tags within a coverage area, are costly and their reach for powering the tags is limited. A tag which has been powered, (especially a tag as in the above patent and as in copending application Ser. No. 10/919,800 of Tagent Corporation) will exhibit an effective transmit distance far greater than the reach of a powering RF signal that is within the range of size, cost and power practical for use in RFID applications. In other words, in a typical situation the transmitted signal from each RFID tag can be read from a far greater distance than the distance to which an interrogator device sending out a powering signal can reach to power up the tags. As a result, in the usual situation the tags (and the attached products) must be brought close to the reader to be accounted for, inventoried and tracked, unless multiple costly readers are dispersed throughout an area.

SUMMARY OF THE INVENTION

The current invention addresses the above problem in an efficient way so as to enable inventorying and tracking of a multiplicity of RFID tags within an area without requiring multiple readers, or requiring a minimum of readers.

As in the above-referenced copending application, the invention uses separate power and data frequencies to accurately track items within a space. The system of the invention involves placement of small, inexpensive power modules or power nodes strategically within the space concerned, to gain coverage of the area. The data reader component of the system is put in a location away from the power modules so as to leverage the positions of the power modules and data reader to track items contained or moving through the space. The number of power modules will always be greater than the number of data readers, since, as explained above, the range of a power/read RFID system is limited by the range of the power up link, which is considerably shorter than the distance over which a tag's transmission can be read. In a typical case more power modules than data reader modules, sometimes more than a ratio than 10:1, will be deployed, depending on the space concerned. The optimum number and ratio of power modules will be determined by the application.

Thus, instead of powering the tags by RF signal sent from the data reader modules, a number of inexpensive, discrete power modules are employed to power the tags. The inexpensive power modules or power nodes are distributed throughout the space in which the tags will be located, to thereby power the tags from a relatively short distance and enable the tags to transmit through a greater distance. One or more of the readers can include a power-node control which sends an RF signal to control on/off status of specific power nodes within the area. This enables the area to be divided into zones, with power nodes activated zone by zone in sequence, thereby to permit the reader to determine location by zone of products as their RFID tags are read.

If multiple readers are present in an area, tag response time or signal strength and triangulation can be used to approximately locate a tag's position.

Accordingly, in one preferred embodiment of the invention a system for identifying products bearing RFID tags uses a reader receiving data signals transmitted on a data frequency by tags on a multiplicity of such products, the tags being powered by received RF energy. The data frequency is different from the power frequency. One or more readers are positioned within a product-containing area, to receive transmitted data from the RFID tags on the data frequency. A plurality of power nodes are located within the area, the power nodes being separate from the readers and spaced apart within the area, each power node being capable of sending a power frequency RF signal that can power up RFID tags within a transmit distance of the power node. By this system, powering of RFID tags can be by selected zones within the area, if desired, and tags can be powered up to be read from positions generally more distant from a particular reader than possible if a powering signal were sent by the particular reader itself.

In a preferred implementation of the system, at least one reader within the area includes a power-node control which sends an RF signal to control on/off status of specific power nodes within the area, whereby the area can be divided into zones, with power nodes activated by zones, thereby permitting the reader to determine location by zone of products as their RFID tags are read. This can be even more localized, with control of a single node by the reader.

It is thus among the objects of the invention to improve efficiency and cost-effectiveness of an RFID system within a space containing a multiplicity of RFID tag-bearing products, primarily through the use of multiple power-up nodes or power modules within a space which has only one interrogator or reader, or if plural readers, far fewer readers than power modules. These and other objects, advantages and features of the invention will be apparent from the following description of a preferred embodiment, considered along with the accompanying drawings.

DESCRIPTION OF PREFERRED EMBODIMENTS

Figure 1:
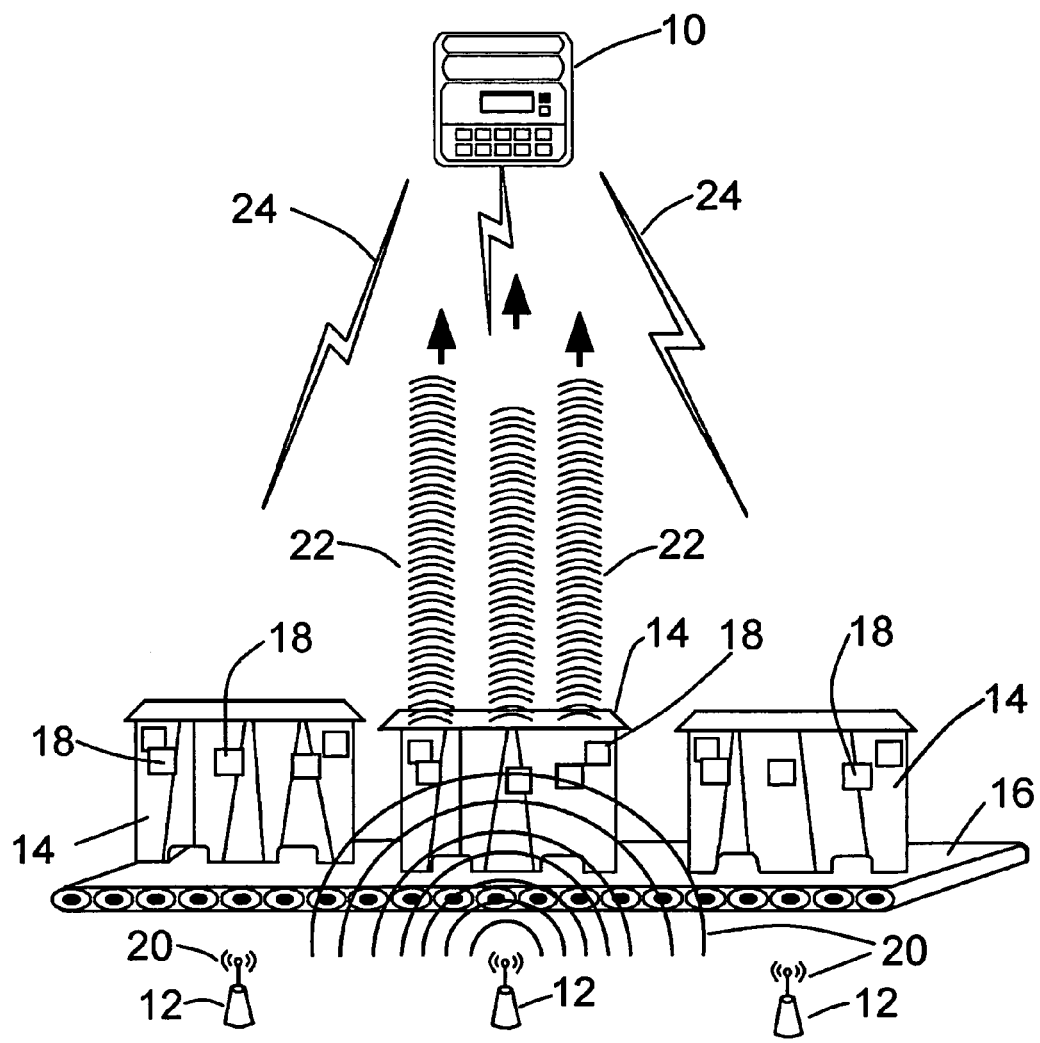
FIG. 1 is a schematic representation, generally in elevation and with some perspective, indicating an RFID system wherein a multiplicity of tags are powered using multiple power nodes within the system, and read by a single reader.

In the drawings, FIG. 1 schematically illustrates a system according to the invention for powering and reading RFID tags, with powering accomplished not by the reader (although the reader could comprise one of many powering nodes). In this system, an area contains a large number of products or components bearing RFID tags; the products or components may be moving, as through an assembly line or assembly process, or may be stationary, stored in a warehouse or other location, even in a retail space.

As explained above, readers or interrogators, such as the reader 10 shown in FIG. 1, are fairly costly, and the range from which they can read a powered-up ID tag is generally much greater than the range over which the reader can supply RF energy to powerup a tag. With the invention a series of power nodes 12 are employed for powering the tags, these power nodes 12 being distributed fairly evenly throughout the area, or at least fairly evenly throughout portions of the area where the RFID tags will be located (which could be along a stream of moving products). In the schematic example of FIG. 1, the components or products 14 are moving on a conveyor belt 16, and the power nodes 12 are located beneath the path of travel of these products. The RFID tags are indicated at 18. As the drawing shows, each component or product 14 can carry several different ID tags 18; for example, each of a number of components on a product can bear its own RFID tag. Further, the items 14 could each be a bin that carries multiple individual products, with the bin 14 used to ship them loose to the end customer or to store them.

As schematically shown in FIG. 1, the power nodes 12 emit RF energy 20 at a tag-powering frequency, which will be different from the data frequency at which the tags transmit their data. With the power nodes 12 located easily within range of the multiplicity of RFID tags 18, the tags are powered. Thus, the reader does not actually send out an interrogating signal, which was the case in the patent and the copending application referenced above. Instead, the tags are powered by the power nodes 12 independent from the reader 10. Data transmission from the tags is indicated, for example, at 22 in the drawing. The reader 10 is within range of the tag transmissions and receives and reads the data.

Depending on how the tags are produced and set, they could transmit their data only once during a period when they are continuously powered by the nodes, or they could retransmit a preset number of times, with a fixed delay between transmissions. When powering via the nodes is discontinued, this can have the effect of resetting the tags, so that they will again transmit once or the preset number of times.

FIG. 1 also indicates the reader 10 may have capability of controlling the power nodes 12. Power node control signals 24 are sent out by the reader to control the on/off status of all power nodes within the area. As described above, this allows the system to be designed so as to power up tags only in certain portions or zones of the area. This might be because of ongoing assembly line operations, where data is only needed from certain portions of the area at certain times, or it can be for the purpose of locating the tags and their products by zone. Control can be very localized, even with control of single power nodes individually.

Figure 2:
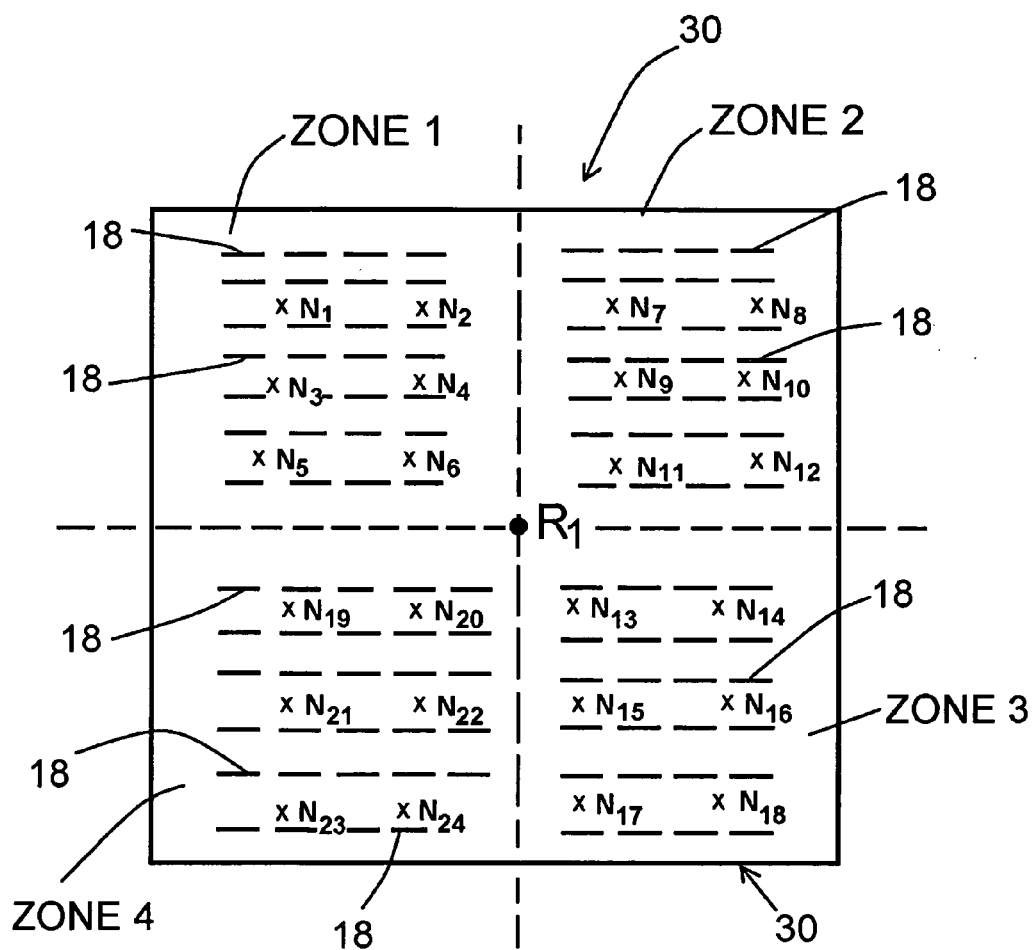
FIG. 2 is a schematic plan view showing an implementation of the invention in an area of RFID-tagged items, with the area being divided into zones.

FIG. 2 shows schematically an area 30, represented as a simple rectangle, divided into a plurality of zones, in this example four zones denominated zones 1 through 4. A reader 10 is shown at the center of the area in this example, at $R_1$. There may be more readers in many situations, depending primarily on the size of the area 30, the distances involved, the reading distance capability of the reader or readers employed, and possibly a use of multiple readers for distance determination as explained below.

FIG. 2 also shows a multiplicity of RFID tags 18, which are attached to products or components (not shown), distributed throughout the area. Distribution, of course, can be very uneven in many situations, such as an assembly line. Distributed among the multiplicity of tags 18 are a number of power nodes; in this case 24 are indicated, from $N_1$ to $N_{24}$. Each zone in this example is shown as having six power nodes distributed throughout the zone, but the arrangement will depend on where the tags are normally to be located, whether they are moving or stationary, etc.

As outlined above, the reader $R_1$ (10) has, in the example of FIG. 2, capability of sending signals for power node control. Each RFID tag transmits a unique signal. In order to determine where each of the components and RFID tags are located (or where certain ones of them are located), the power node control function of the reader can activate zone 1's power nodes $N_1$ through $N_6$ for a period, receiving all the transmitted responses, then shut off zone 1's power node and cause the nodes in zone 2 to be powered, reading the transmissions from all tags within that zone. This progresses through the zones, and since only one zone at a time will have tags that are powered, all transmitted signals from the RFID tags reaching the reader $R_1$ in a particular period of time will be known to be from the powered zone. This assumes that all tags in one zone are out of range of all power nodes of neighboring zones.

Thus, in an assembly operation where the tags may be constantly moving or moving intermittently through the assembly system, localized zones can be powered as desired to monitor progress. An area can be divided into fewer or many more zones if desired. In an inventory situation, tags may be located throughout a warehouse floor, with one or more readers in the area. Power nodes can be switched on in localized areas to read what products are contained in many such localized areas. Note that the reader 10 or $R_1$ merely sends an RF signal to a local receiver within the zone of interest, the receiver receives a signal and, through a relay or other devices, switches on power to the nodes in that localized zone for either a predetermined period of time or a time as signaled by the power node control signal 24 transmitted by the reader.

Figure 3:
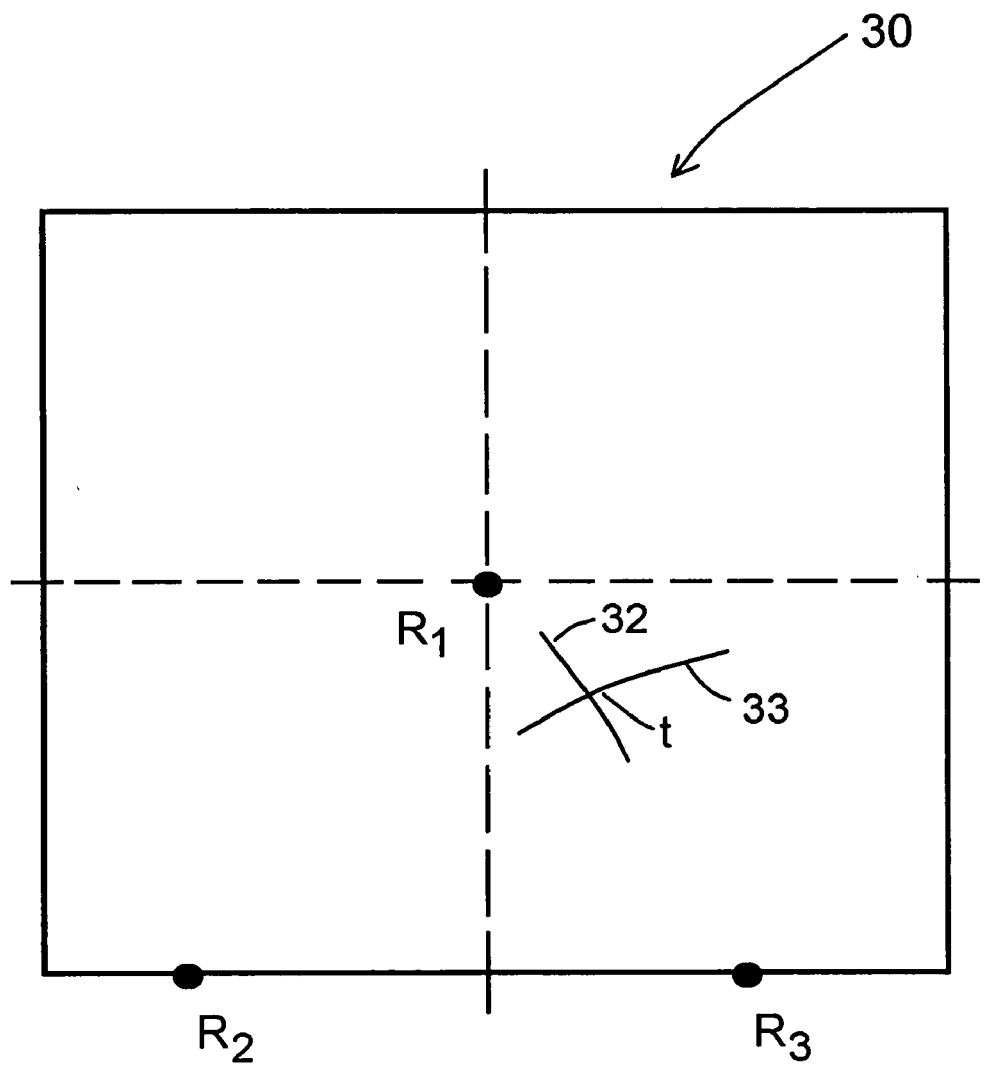
FIG. 3 is a schematic plan view to illustrate use of triangulation to locate a tag.

It is also possible to determine the precise location of a particular product and RFID tag using triangulation. This can be accomplished by having multiple readers within or near a zone at a known location within the zone. Each reader can then read the tags at different times (or simultaneously), and each reader will receive a particular tag's transmission at a different transmitted signal strength which depends on where the tag is, and which can be measured by the reader. With this information and known or empirically determined distance/signal strength correlation data, a triangulation can be done to determine the location of the tag. Two readers are sufficient in some cases, but sometimes three are needed. Two will define two points, only one of which will be valid if the other would fall outside of the area 30 concerned. For example, FIG. 3 shows schematically a simplified situation in which the reader $R_1$ is in the center of the area concerned, and the system includes two more readers $R_2$ and $R_3$, positioned as shown. If a signal strength triangulation is used with the readers $R_2$ and $R_3$ to identify the location of a particular tag in the area 30, a signal strength triangulation will produce two intersecting circles, represented by arcs 32 and 33 shown within the area 30. The circles will also intersect outside the area 30, in a mirror-image position lower on the page of FIG. 3, but this point will not be valid. Thus, the unique location t is the unique identifier of the tag's position. It could be seen from FIG. 3 that all three readers (or a group of three other readers) will be needed in many cases, when two readers would produce two points both within the area 30.

The location of a tag could also be determined by time of flight of the transmitted signal from a particular tag to a plurality of readers. If each tag carries a different random transmit time delay, as is preferred for collision avoidance, then time of departure of the transmission from a tag will not be known. However, with three readers in different and known positions (such as the readers $R_1$, $R_2$ and $R_3$ in FIG. 3), the time differences in receipt of the particular tag's transmission among the three readers can be used to determine a unique position for the tag. With two readers the time delay can be used to plot a curve of possible positions of the tag; the third reader narrows the locations to a single point.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A system for identifying and tracking movable products bearing RFID tags using a reader receiving data signals transmitted on a data frequency by tags on a multiplicity of such products, the tags being powered by received RF energy on a power frequency, comprising:
   a product-containing area within which the multiplicity of products are located, the products each having an RFID tag,
   one or more readers within the product-containing area to receive transmitted data from the RFID tags on the data frequency, and
   a plurality of power nodes within the area, the power nodes being independently powered, separate from and spaced from the readers and the tags and spaced apart within the area, each power node when activated sending an RF signal on the power frequency powering up RFID tags within a transmit distance of the power node,
   whereby tags are powered up to be read from positions generally more distant from a particular reader than possible if a powering signal were sent by the particular reader itself.

2. The system of claim 1, wherein said transmit distance of the power nodes is less than the reading distance of the one or more readers.

3. The system of claim 2, wherein a coding gain scheme is used within the RFID tag data transmission so that the distance read by the reader can be increased without increasing the RFID tag's transmitted power.

4. The system of claim 1, wherein the number of power nodes in the area is greater than the number of readers.

5. The system of claim 4, wherein the number of power nodes in the area is more than twice the number of readers in the area.

6. The system of claim 1, wherein at least one reader within the area includes a power-node control which sends an RF signal to control on/off status of specific power nodes within the area, and the area being divided into zones, with power nodes activated by zones selectively, permitting the reader to determine location by zone of products as their RFID tags are read.

7. The system of claim 1, wherein the RFID tags transmit using UWB.

8. The system of claim 7, the reader having means for receiving strength indication to determine the distance of a read RFID tag from the reader.

9. The system of claim 7, wherein some of the RFID tags transmit on a different transmission frequency from other ones of the RFID tags, the frequencies being set at the time of manufacturing.

10. The system of claim 7, wherein the transmitted signal from the tags is Pulse Position Modulated (PPM).

11. The system of claim 7, wherein the transmitted data contains a pre-amble and a post-amble to determine where the transmitted data starts and stops.

12. The system of claim 1, the reader having means for receive strength indication to determine the distance of a read RFID tag from the reader.

13. The system of claim 12, wherein at least two readers are in or adjacent to the product-containing area, enabling triangulation to locate a tag's position.

14. The system of claim 1, including three readers in or adjacent to the product-containing area, the three readers being in communication and noting the time of arrival of a transmitted signal from a particular tag, so that differences in arrival time among the three readers can be used to determine a unique position for the tag.

15. The system of claim 1, wherein the data frequency is different from the power frequency.

* * * * *